VIBRATION COMPACTION PROCESSING OF MAGNETIC TAPE

Original Filed Jan. 2, 1970

United States Patent Office
3,817,785
Patented June 18, 1974

3,817,785
VIBRATION COMPACTION PROCESSING OF MAGNETIC TAPE

Georges D. Abitboul, Los Angeles, Calif., assignor to Audio Magnetics Corporation, Gardena, Calif.
Continuation of abandoned application Ser. No. 244, Jan. 2, 1970. This application Jan. 12, 1972, Ser. No. 217,240
Int. Cl. H01f 10/00
U.S. Cl. 117—237 8 Claims

ABSTRACT OF THE DISCLOSURE

The tip of a vibratory head is urged against a magnetic tape consisting of a thin coating of granular magnetizable material on a flexible backer strip; the tip is vibrated to cyclically increase and decrease the loading and thereby compact the coating section in alignment with the tip; and the tape is urged in the direction of its length so that the coated section is advanced in that direction during time intervals of decreased loading.

This application is a continuation of Ser. No. 244, filed Jan. 2, 1970, and now abandoned.

BACKGROUND OF THE INVENTION

This invention relates generally to improving the recording sensitivity of magnetic tape, and more particularly concerns method and apparatus for effecting such improvements through vibration compaction.

Magnetic tape typically comprises a backing strip or layer of tough flexible material such as plastic, e.g. polyester film (for example Mylar) which is electrically nonresponsive, high in tensile strength and abrasion resistant, together with a magnetically responsive coating (as for example iron oxide) applied to the backing typically by solvent based adhesive techniques. The resulting tape is wound on a reel for use in recording patterns of electromagnetic radiation corresponding to a light and/or program sound source applied to the tape by an electromagnetic head.

Present day backing is ultra-thin, often one mil or less, in thickness, and the magnetic coating thereon may be as little as one or two tenths of a mil. These dimensions pose great problems in attempting to produce at commercially feasible rates a uniform, high quality tape product. Variations in tape thickness, irregularity in the coating material or its application each can cause nonuniformity in the coating thickness of the tape product and lower than desired quality. For example, a rough coating may be characterized by crests and valleys, with crest to crest dimensions of between .5 to 1.0 mils, with crest to valley depths of somewhat less dimensions. Such roughness undesirably reduces the recording sensitivity of the tape particularly the high frequency response thereof.

SUMMARY OF THE INVENTION

It is a major object of the invention to overcome lack of recording sensitivity (particularly high frequency response) caused by poor dispersion of the coating, poor control of solvent evaporation, and coating roughness. Basically, the method of the invention comprises urging the tip; effecting vibration of the tip toward and away compressive loading to a coated section in alignment with the tip; effecting vibratin of the tip toward and away from the tape to cyclically increase and decrease such loading and thereby compact the coating section; and urging the tape in the direction of its length so that the tape section is transported in its length direction relative to the head during time intervals of such decreased loading. As will appear, the vibration is typically effected at ultrasonic frequency to produce a glossy finish on the coating indicative of a substantial reduction in surface roughness; and the tape is typically supported on an anvil which moves with the tape during the processing. As a result, the coated side of the tape may be applied to the anvil and the backer side of the tape may engage the ultrasonic head, to substantially eliminate head tip and anvil wear.

Additional steps and features of the method may typically include the transportation of the tape at a speed so related to the tip vibration frequency that each compacted increment of the coating is subjected to several and preferably more than five compacting cycles; the production of local stresses in the compacted coating of between 500 and 5,000 p.s.i.; the vibration of the tip with an amplitude of between .0005 and .005 inch; the alternative provision of an anvil membrane which is fluid cooled; and the provision of improved tape treated as described.

As respects the apparatus of the invention, it includes a vibrating head having a tip; means for urging the head in a direction to urge the tip against the tape to transmit compressive loading to the coating section in alignment with the tip; means for effecting vibration of the head to cause the tip to vibrate toward and away from the tape for cyclically increasing and decreasing the loading and thereby compacting the coating section; and means for urging the tape in the direction of its length so that the tape section is transported in that direction during time intervals of such decreased loading. Additionally, the apparatus may typically include an anvil over which the tape is transported and which receives loading via the tape, the anvil desirably comprising a roller mounted to rotate with the tape. The anvil may have a hard cylindrical surface, and means may be provided to maintain the surface absolutely clean by removal of adherent coating particles.

These and other objects and advantages of the invention will be more fully understood from the following description and drawings, in which:

DRAWING DESCRIPTION

DESCRIPTION OF PREFERRED EMBODIMENT

Figures 1, 2, 3, 4, 5:
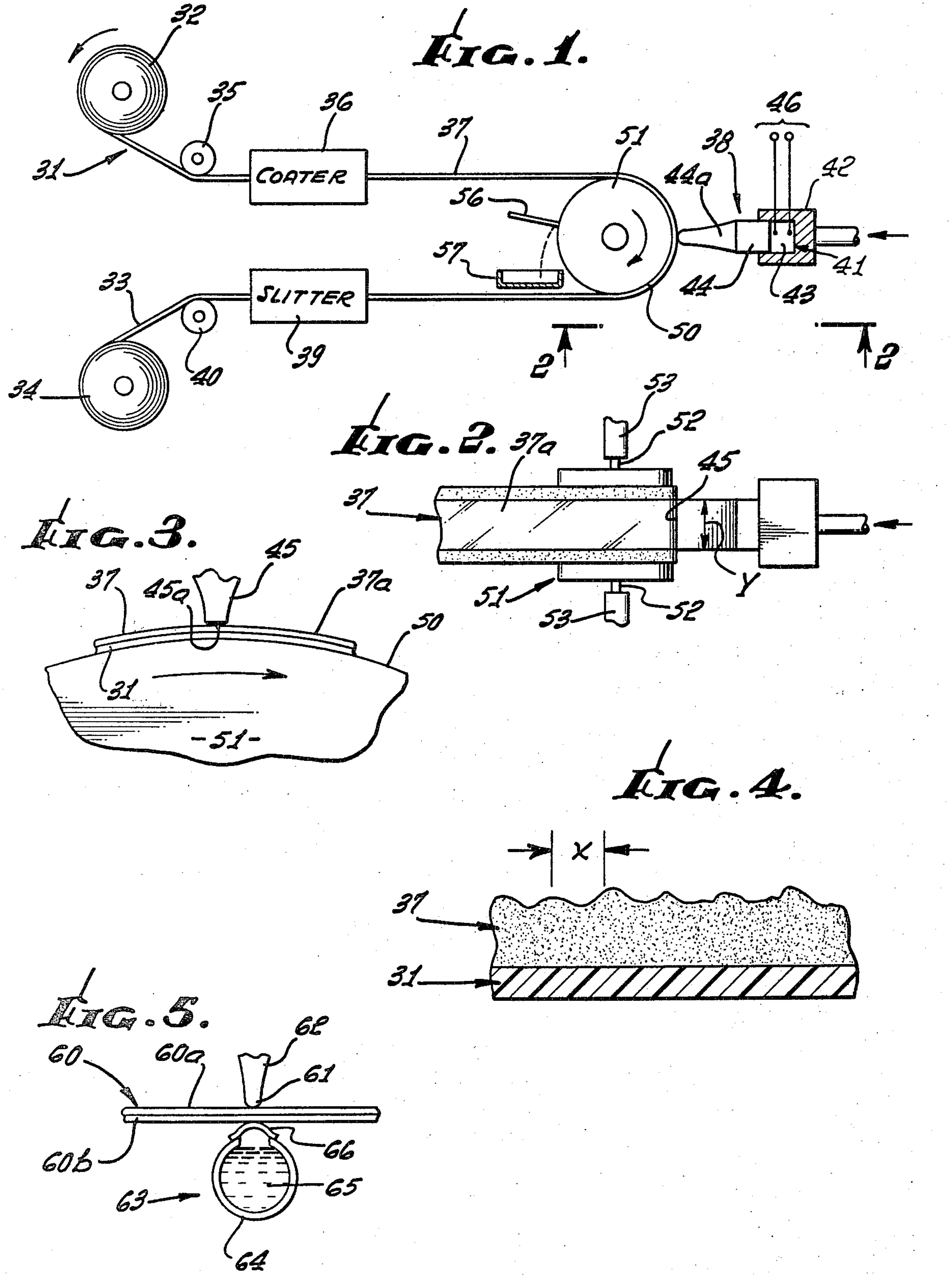
FIG. 1 is a schematic view of tape treating apparatus.
FIG. 2 is an elevation taken on line 2—2 of FIG. 1.
FIG. 3 is an enlarged elevation showing ultrasonic treatment.
FIG. 4 is an enlarged view of tape including rough surfaced coating on a backer strip.
FIG. 5 shows a modified treating apparatus.

Referring to FIG. 1, apparatus is shown for converting sheet or backer material 31 from supply roll 32 into magnetic tape 33 being wound on take-up roll 34. The sheet 31 may be any material suitable for use as a backing for magnetic tape. Thus, self-supporting films of cellulose acetate, Mylar (polyester) and polyolefin having thicknesses in the range of 2 to 0.5 or even 0.25 mil may be used providing sufficient tensile strength is maintained. The sheet 31, typically wider than ultimately required for the magnetic tape to be produced, is drawn over an idler roll 35 and into a coater 36. Coating operations may comprise application within coater 36 of magnetizable material such as $Fe_2O_3$ in a liquid binder such as vinyl resin in an organic solvent and evaporation of the solvent to leave the magnetizable material 37 adherent to the sheet 31 as best shown in FIG. 3 and typically at thicknesses of 0.1 to 0.2 mil. One or both sides of the sheet 31 may be so coated as desired.

The sheet 31 is then passed to the ultrasonic treater 38 which treats the coating material 37 adhered to the sheet 31 with ultrasonic vibrations to smooth irregularities in the coating and render more uniform and consistent the distribution thereof over the sheet material 31 surface.

The coated sheet 31 emerging from the treater 38 is drawn to and through slitter 39 where the sheet, which may originally have a width two or many times the width ultimately required in the magnetic tape 33, is slit lengthwise to appropriate, required widths of magnetic tape and passed around idler 40, drawn by take-up roll 34.

The treater 38 comprises a vibratory head having a tip urged against the tape to transmit compressive loading to a coated section in alignment with the tip. As the tip is vibrated toward and away from the tape, the loading transmitted to the tape is cyclically increased and decreased for compacting the coated section; also, the tape is urged in the direction of its length so that the section retained by the tip of the head is repeatedly sufficiently released to permit progressive incremental advancement of the tape relative to the tip during time intervals of decreased loading of the tape by the tip. Preferably, the tip vibration is carried out at ultrasonic frequency, as for example in excess of 16,000 cycles per second; and tip vibration is carried out with an amplitude to produce a highly glossy finish at *37a* on the otherwise dull surfaced coating, indicating that the surface roughness is reduced to between 1 to 10 microinches.

The vibratory tool shown in FIGS. 1 and 2 comprises an ultrasonic generator 41 carried by a holder 42. The generator may include a transducer 43 operatively connected to a metallic head 44 which is tapered at *44a* to terminate at a tip 45. The latter has narrow width and sufficient length to extend over the major width of the tape coating for engagement therewith to treat the coating. The transducer 43 may be of magnetostrictive or electrostrictive type, with AC input connections indicated at 46. Experiment shows that the energy per unit area (i.e. $\sigma$) required to process the tape should, for satisfactory results, lie between 15 and 35 inch-pounds per square inch. The power required to treat the tape may be expressed as follows:

$$\text{power}=V\sigma\Omega$$

where:

$\sigma$=energy per unit area (in.-lbs./sq. in.)
V=tape speed (inches/sec.)
$\Omega$=horn tip width (inches)

It has been found that best results occur when the energy density lies between 20 and 25 in.-lbs./sq. in., and the horn-tip peak-to-peak amplitude is between 1.5 and 3.0 mils. As an example, if it is desired to treat a 5 inch wide roll of tape at a tape speed of 24 inches per second, the power required at the horn tip to process the tape on a continuous basis at an energy density of 25 in.-lbs./sq. in. is:

$$P=(25\text{ in.-lbs./sq. in.})\ (5\text{ in.})\ (24\text{ in./sec.}) =3{,}000\text{ in.-lbs./sec.}$$

Further, the vibration should produce local stresses in the compacted coating of between 500 and 5,000 p.s.i., and each increment of the treated coating should receive at least five compacting strokes of the tip, for best results. Vibration of the tip with amplitude between .0005 and .005 inch produces best results.

It will be noted in FIGS. 1 and 3 that the tape is supported during its treatment on the hard surface 50 of an anvil which may comprise a roller 51. The latter may in turn be supported on axles 52 carried by bearings 53 and in such manner that the roller rotates with the tape in non-slip engagement with surface 50. Further, the abrasive coating 37 may face and engage surface 50 so that the non-abrasive backer strip 31 is actively engaged by the tip 45, eliminating problems of tip wear; however, the invention does not preclude the orientation of the tape with the coating exposed for engagement by the tip. In any event, the tip may be hardened at *45a*, as by chrome plating, to eliminate wear problems for all practical purposes.

Photomicrographs of the untreated tape coating 37 demonstrate that it is characterized by a dense population of craters, pox marks and ruts having average crest-to-crest dimensions X of between .1 and .5 mils, as is diagrammatically represented in FIG. 4. In addition, various shaped iron oxide nodules protrude above the average surface level, and range from .2 to 2 mils in lateral dimension. On the other hand, after ultrasonic treatment as described, the coating *37a* has very few visible craters, the surface roughness is reduced to between 1 and 10 microinches, and the surface resembles the surface features of sintered bronze. Compared to untreated tape, the sensitivity of the treated tape is typically up about 6 db at 5 KHz., and up about 1.5 db at .5 KHz.

It is also found that the grain size of the coating is on the order of about 10 microinches. Therefore, the surface finish of the horn tip *45a* and of the anvil surface 50 should be at least 10 microinches, and preferably finer than that. Since the average distance from ridge to valley in the untreated coating is on the order of 100 microinches, the flatness (i.e. expressed as out-of-parallelism) of the horn tip and anvil must be less than this distance over the length dimension Y of the horn tip.

The anvil roller 51 may typically have a polished chrome surface to resist oxide abrasion. Further, that surface should be kept free of tiny oxide particles separating from the coating in engagement therewith, so that such particles do not enter between the roller and the tape being fed onto the roller to locally bulge the tape toward the horn tip. For this purpose, a wiper 56 may be located to wipe the surface 50 as indicated in FIG. 1, and excess particles falling from the wiper may collect in a collector 57.

FIG. 5 shows an alternate embodiment wherein the tape 60 passes between the tip 61 of an ultrasonic generator 62 in engagement with the backer strip *60a*, and an anvil 63. The latter includes a container 64 for liquid 65 under pressure sufficient to bulge a membrane 66 into forcible frictional engagement with the tape coating *60b*. The liquid is circulated through the container or duct 64 in cooling relation with the membrane which is heated by the energy input to the tape by ultrasonic treatment. The membrane may consist of a thin sheet of metal which is chrome plated.

I claim:

1. The method of improving the recording sensitivity of magnetic tape consisting of a thin coating of granular magnetizable material dispersed in a resinous binder on a flexible backer strip, that includes (a) urging the tip of a vibratory head against the tape to transmit compressive loading to a coating section in alignment with the tip, (b) effecting vibration of the tip at ultrasonic frequency toward and away from the tape to cyclically increase and decrease said loading and thereby compacting the coated section continuously along the length thereof, (c) urging the tape in the direction of its length so that said tape section is advanced in said direction relative to the tip during time intervals of such decreased loading, and (d) rigidly supporting the tape on an anvil surface in alignment with said tip during said compacting, and moving said surface in the direction of tape advancement during said advancement.

2. The method of claim 1 wherein the backer strip is interposed between the tip and coating during said compacting of the coating.

3. The method of claim 1 wherein said tip vibration is carried out at an amplitude to produce a glossy finish on the coating.

4. The method of claim 3 wherein the tape is transported at a speed so related to the frequency of said vibration that each compacted increment of the coating is subjected to at least five compacting cycles.

5. The method of claim 4 wherein said vibration of the tip is carried out to produce local stresses in the compacted coating of between 500 and 5,000 p.s.i.

6. The method of claim 1 wherein said tip vibration is carried out with an amplitude of between .0005 and .005 inch.

7. The method of claim 1 wherein said supporting step is carried out by effecting rotation of said anvil surface with the tape, the coating engaging said surface during said rotation.

8. The method of claim 7 wherein said surface is cylindrical, and including the step of removing particles of coating from said surface off which the tape has passed and prior to surface rotation to re-engage the tape coating.

References Cited

UNITED STATES PATENTS

| | | | |
|---|---|---|---|
| 2,097,601 | 11/1937 | Potdevin | 117—VIB Dig. |
| 2,200,155 | 5/1940 | Camp et al. | 117—VIB Dig. |
| 2,252,345 | 8/1941 | Johnson | 117—Air Blast Dig. |
| 2,522,082 | 9/1950 | Arnold | 117—UB Dig. |
| 2,778,744 | 1/1957 | Holt | 117—64 X |
| 3,012,901 | 12/1961 | Reese | 118—57 U |
| 3,023,123 | 2/1962 | Colwill et al. | 117—237 X |
| 3,104,983 | 9/1963 | Tarwater et al. | 117—237 |
| 3,261,706 | 7/1966 | Nesh | 117—237 |
| 3,533,836 | 10/1970 | Massengale et al. | 117—235 |
| 3,473,960 | 10/1969 | Jacobson | 117—237 |
| 3,398,011 | 8/1968 | Neirotti et al. | 117—237 |
| 3,592,687 | 7/1971 | Schnell et al. | 117—237 |

MICHAEL SOFOCLEOUS, Primary Examiner

B. D. PIANALTO, Assistant Examiner

U.S. Cl. X.R.

117—235